(12) United States Patent
Alberto de Rojas

(10) Patent No.: US 7,732,006 B2
(45) Date of Patent: Jun. 8, 2010

(54) COATING COMPOSITION AND OPTICAL MAR-RESISTANT TINTABLE COATING

(75) Inventor: Agustin Alberto de Rojas, Boca Raton, FL (US)

(73) Assignee: Quest Optical, Incorporated, Boca Raton, FL (US)

( * ) Notice: Subject to any disclaimer, the term of this patent is extended or adjusted under 35 U.S.C. 154(b) by 834 days.

(21) Appl. No.: 11/511,048

(22) Filed: Aug. 28, 2006

(65) Prior Publication Data

US 2008/0047468 A1 Feb. 28, 2008

(51) Int. Cl.
*B05D 5/06* (2006.01)
(52) U.S. Cl. ....................... 427/162; 427/169
(58) Field of Classification Search .......... None
See application file for complete search history.

(56) References Cited

U.S. PATENT DOCUMENTS

| | | | | |
|---|---|---|---|---|
| 3,867,901 A * | 2/1975 | Greiller | ............... | 118/50 |
| 4,073,967 A | 2/1978 | Sandvig | ............... | 427/503 |
| 4,211,823 A | 7/1980 | Suzuki et al. | ............... | 428/412 |
| 4,304,879 A | 12/1981 | Ehrhart et al. | ............... | 522/104 |
| 4,311,368 A | 1/1982 | Saito et al. | ............... | 351/165 |
| 4,377,389 A | 3/1983 | Haddad et al. | ............... | 8/506 |
| 5,410,625 A | 4/1995 | Jenkins et al. | ............... | 385/28 |
| 5,453,100 A * | 9/1995 | Sieloff | ............... | 8/479 |
| 5,624,757 A | 4/1997 | Smith | ............... | 428/412 |
| 5,723,175 A | 3/1998 | Scholz et al. | ............... | 427/161 |
| 5,744,243 A | 4/1998 | Li et al. | ............... | 428/447 |
| 5,910,375 A * | 6/1999 | Parker et al. | ............... | 428/520 |
| 5,916,669 A * | 6/1999 | Parker et al. | ............... | 428/216 |
| 5,977,256 A | 11/1999 | Huybrechts et al. | ............... | 525/131 |
| 6,087,469 A | 7/2000 | Epple et al. | ............... | 528/307 |
| 6,100,313 A | 8/2000 | Treadway | ............... | 522/170 |
| 6,780,232 B2 | 8/2004 | Treadway | ............... | 106/287.12 |
| 6,927,252 B2 | 8/2005 | Mellado et al. | ............... | 524/777 |
| 6,951,894 B1 | 10/2005 | Nicolson et al. | ............... | 523/107 |
| 7,034,063 B2 | 4/2006 | Nienhaus et al. | ............... | 522/91 |
| 7,037,585 B2 | 5/2006 | Treadway | ............... | 428/413 |
| 7,157,146 B2 * | 1/2007 | Higuchi et al. | ............... | 428/447 |
| 7,442,734 B2 * | 10/2008 | Mori et al. | ............... | 524/107 |

FOREIGN PATENT DOCUMENTS

| | | |
|---|---|---|
| DE | 196 45 761 A | 5/1998 |
| EP | 0 447 998 B1 | 9/1991 |
| EP | 0 462 287 B1 | 12/1991 |
| EP | 0 608 021 B1 | 7/1994 |
| EP | 0 661 321 B1 | 7/1995 |
| EP | 0 742 239 A1 | 11/1996 |
| WO | WO 98/10028 | 9/1997 |

* cited by examiner

*Primary Examiner*—Shamim Ahmed
(74) *Attorney, Agent, or Firm*—Mark A. Litman & Associates, P.A.

(57) ABSTRACT

A coating composition and coating for ophthalmic lenses and other polymeric substrates having a unique combination of excellent solution stability, rapid cure rate, improved mar resistance, rapid dye absorption, and improved receptivity towards antireflective coatings. The coating comprises an abrasion resistant polymer and a dye-absorption-enhancing oligomer. The coating is tinted after curing with a dye to provide light absorbency in the coating.

18 Claims, No Drawings

COATING COMPOSITION AND OPTICAL MAR-RESISTANT TINTABLE COATING

BACKGROUND OF THE INVENTION

1. Field of the Invention

The present invention relates to a rapidly cured, highly tintable, mar resistant coating composition and for the coatings produced thereby. The coatings are used for polymeric substrates, particularly ophthalmic lenses, and more particularly polycarbonate ophthalmic lenses, to which a subsequently applied antireflective coating may be applied with excellent adhesion.

2. Background of the Art

Polymeric materials have numerous advantages over glass in terms of impact resistance, weight, cost, ease of manufacture, and other aspects, for which reason polymeric materials are commonly used to manufacture a great many products worldwide. However, in many applications, the use of a polymeric material necessitates the use of one or more coatings in order to obtain properties, such as mar resistance, tintability, optical properties, and other features, that are required for a particular application. For this reason, coatings for polymeric materials are of great interest and a great deal of effort has been exerted in this area.

Until recently, there have been primarily two general types of transparent coatings that have been employed on polymeric substrates that allow the transparent properties of the polymeric materials to be utilized. These two general categories include the radiation cured coatings and the thermally cured coatings. Coatings of the former type usually contain acrylate or acrylate and oxirane functional compounds that are polymerized on exposure to radiation of a particular wavelength that is capable of acting upon a polymerization initiator to commence polymerization. Coatings of the latter type usually contain siloxanes or other organometallic materials and metal oxides that are polymerized on exposure to heat, which may come from a variety of convection, radiant, or other sources.

The advantages of the radiation cured coatings include good coating stability, very rapid cure in under one minute at relatively low temperature, primerless adhesion to many substrates, rapid dye absorption in a tinting process, and the potential for very low solvent concentration so as to allow for a minimal amount of emissions of volatile organic compounds. The disadvantages of this type of coating include relatively poor mar resistance and poor adhesion of subsequently applied antireflective coatings. Though fewer in number than the advantages, these disadvantages are very serious in demanding applications requiring these properties, which thus severely limits the use of these coatings.

The advantages of the thermally cured coatings include superior mar resistance and they serve as an excellent base for subsequently applied antireflective coatings of any type. The disadvantages of this type of coating include long cure times over several hours at elevated temperatures, relatively little dye absorption, and poor adhesion, such that a primer is usually required unless the formula is modified so as to obtain primerless adhesion at the expense of solution stability.

These two types of coatings are at opposite extremes. What is desired, particularly in the ophthalmic lens industry, is a coating solution that is very stable at room temperature, has excellent adhesion to all common polymeric substrates without the use of a primer, will cure very rapidly in a few seconds to give a coating that can be tinted very quickly, has better mar resistance than the present radiation cured coatings, and provides an excellent base for an antireflective coating of any variety. The present invention provides for just this combination of properties, which heretofore has not been found.

Previous attempts have been made by others to achieve a compromise to incorporate the benefits of both types of coating into one. One approach has been to incorporate very fine particles of silica or metal oxide into a radiation curable coating. This approach has had very limited success since, even at high concentrations of particles, the properties of the coating tend to mimic those of the continuous organic phase, not the disperse phase. This format of mar-resistant or abrasion resistant coatings are shown in such disclosures as U.S. Pat. Nos. 4,073,967; 6,951,894; 5,744,243; 5,624,757; and 5,723,175.

Another approach has been to use siloxane monomers with organofunctional moieties that can be exploited for rapid radiation cure. This approach avoids the formation of a dual phase system and thereby has the potential for better coating performance in the cured film. However, previous efforts in this area have resulted in poor solution stability and high viscosity requiring compromises in performance properties such as mar resistance or tintability. In the above approach, U.S. Pat. No. 6,100,313 (Treadway) teaches the use of one or more polymerizable ethers. The coatings of the present invention specifically avoid the use of these materials due to their known deleterious effect on adhesion, mar resistance, and durability on exposure to ultraviolet light. Furthermore, some of these materials are known to have serious adverse health effects. Instead, other materials previously not known to be beneficial have been used to enhance the dye absorption of the coatings of the present invention without adversely affecting the adhesion, mar resistance, and exterior durability.

Both U.S. Pat. No. 6,780,232 (Treadway) and U.S. Pat. No. 7,037,585 (Treadway) teach the use of an unhydrolyzed oxirane functional siloxane that is added to reduce the viscosity of the coating solution and effectively reduce the extent of hydrolysis, as without this measure these coatings tend to have poor stability with respect to viscosity. All Patents and applications and texts cited herein are incorporated in their entirety into this application.

SUMMARY OF THE INVENTION

The present invention relates to coatings suitable for use on a wide variety of polymeric substrates. These coatings are rapidly cured, highly tintable, yet more stable in solution and more mar resistant than their radiation cured predecessors, but also serve as a suitable base for subsequently applied antireflective coatings of any variety, whether applied out of solution, sputtered, or applied by other means.

The present invention comprises a substrate having an abrasion resistant coating thereon, the abrasion resistant coating comprising an abrasion resistant polymer comprising one or more of an epoxy-silane polymer and/or an acryloyl-silane polymer and a dye-absorbing oligomer intimately mixed with, dissolved in, or reacted onto the abrasion resistant polymer, the dye absorbing oligomer having a solubility for at least one disperse dye that is at least 5× more readily absorbed into the dye-absorbing enhancer than the abrasion-resistant polymer under dye-tinting absorption conditions, such as immersion in a hot (95° C.) aqueous solution with at least 0.2% by weight dye/water). It is preferred to have the dye-absorbing enhancer react with the abrasion-resistant polymer before tinting of the coating as this better assures retention of abrasion-resistant properties in the final coating.

The coatings of the present invention combine one or more organofunctional trialkoxysilane monomers, deionized or distilled water to effect hydrolysis with or without the aid of an acid or base catalyst, one or more oligomeric materials that are capable of absorbing dyes, such as disperse dyes (the classes of dyes are not critical to the practice of the present technology, but are a known class of dyes in the art, a non-limiting disclosure which includes at least U.S. Pat. Nos. 4,377,389; 4,311,368; 4,211,823; ("Sapphire Blue", Ciba Geigy A.G.); "Diacelliton Fast Navy Blue 2B", Mitsubishi Chemical Industries, Co., Ltd.; PLAX BROWN D" (conventional disperse dye, a product of Hattori Seiko Co., Ltd.); Disperse Blue #3, Disperse Yellow #3 and Disperse Red #17. Chemical identities of these compounds can easily be ascertained by referring to many standard handbooks on dyes, for instance, "The Color Index", 3rd edition published jointly by The Society of Dyes and Colors and the American Association of Textile Chemists and Colorists (1971). Disperse-type dyes are dyes that tend to be insoluble in water or at most slightly soluble in water, but dispersible in water. Water-soluble dyes could be used but might tend to be less substantive in and leachable from the coating. Dyestuffs can generally be used either as a sole dye constituent or as a component of a dye mixture depending upon the color desired. Thus, the term dye as used herein includes dye mixture in a concentration in the oligomer alone sufficient to absorb at least 70% of visible radiation at the wavelength of maximum absorption for the dyes therein, preferably at least 75%, more preferably at least 80% absorption of the incident light at the maximum wavelength of absorption. These dyes may be presently selected from a non-limiting specified list of oligomeric tintability enhancers provided herein to facilitate dye absorption without a loss of mar resistance or adhesion, one or more photoinitiators of the free radical type, the cationic type or both, optionally an organic solvent, and optionally one or more additives such as surfactants or flow modifiers as may be needed to effect good adhesion as well as good cosmetics by enhancing wetting, flow and leveling.

DETAILED DESCRIPTION OF THE INVENTION

The coatings of the present invention contain from 20 to 80 weight percent one or more organofunctional trialkoxysilane monomers as subsequently described in more detail herein; from 1 to 20 weight percent deionized, distilled, or other purified water to effect hydrolysis of at least one third of the alkoxy groups (without introduction of any additional water), with or without the aid of an acid or base catalyst; one or more materials selected from high dye tintability oligomeric enhancers (e.g., see the non-limiting specified list of oligomeric tintability enhancers) to facilitate dye absorption without a loss of mar resistance or adhesion which oligomeric tintability enhancers subsequently described herein; from 1 to 10 weight percent one or more photoinitiators of the free radical type, the cationic type or both; optionally from 0 to 60 weight percent one or more organic solvents to improve stability, reduce viscosity, improve cosmetics, enhance adhesion, and lower costs; and optionally from 0 to 5 percent one or more additives such as surfactants or flow modifiers as may be needed to effect good adhesion as well as good cosmetics by enhancing wetting, flow and leveling.

A non-limiting description of one form of suitable trialkoxysilane monomers may generally be described as have the following formula:

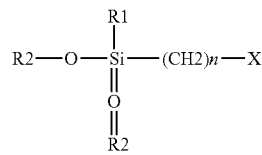

where R1, R2, and R3 are independently selected from the lower alkyl groups including methyl, ethyl, propyl, butyl, or their isomers, n is an integer 1 through 6, inclusive, and where X may be glycidyl, glycidoxy, acrylate, methacrylate, acrylamide, methacrylamide, N-methylacrylamide, N-methylmethacrylamide, vinyl, or allyl.

Examples of suitable organofunctional trialkoxysilane monomers include, but are not limited to, 3-glycidoxypropyltrimethoxysilane, 3-acryloxypropyltrimethoxysilane, 3-methacryloxypropyltrimethoxysilane, 3-acrylamidopropyltrimethoxysilane, 3-methacrylamidopropyltrimethoxysilane, N-methyl-3-acrylamidopropyltrimethoxysilane, N-methyl-3-methacrylamidopropyltrimethoxysilane, vinyltrimethoxysilane, allyltrimethoxysilane, their ethoxy counterparts, their mixed esters, and any combination of these. Other siloxane monomers may optionally be used in addition to those with the above formula, which are needed to facilitate a rapid radiation cure.

The hydrolysis of the trialkoxysilane monomer is the first step in preparing coatings of the present invention. This is optionally but preferably done in an open vessel over a period of 4 to 24 hours, depending on the rate of hydrolysis of the specific siloxane, how much water is added and if a catalyst is used. By hydrolyzing in an open vessel, a substantial volume of alcohol is evaporated rendering the hydrolyzed solution essentially free of any volatile constituents. Optionally, a nitrogen sparge or a partial vacuum or both may be used to facilitate the removal of the alcohol that is liberated as a result of hydrolysis. An organic acid or a mineral acid or a combination of one or more of each may be used to catalyze the hydrolysis. Alternatively, an organic base or a mineral base or a combination of one or more of each may be used to catalyze the hydrolysis. The hydrolyzed solution is then stored at room temperature or below in a closed container until needed or immediately used to prepare the coating solution.

Stability is a critical factor in developing this and similar coatings. A coating with a 3:1 molar ratio of water to trialkoxysilane tends to increase in viscosity as the alkoxy groups hydrolyze to form silanols, which then condense with the evolution of water resulting in polymerization thereby causing the viscosity to increase until it is too high for proper coating application characteristics. Customers, such as some optical laboratories, with high rates of coating consumption typically consume the fresh coating within one week such that the viscosity increase is not critical but many smaller optical laboratories do not rapidly consume coating and may need up to six months to consume a bottle of coating solution during which time absorption of water from the air, evaporative losses of alcohol, and exposure to ultraviolet light from overhead fluorescent lights, or some combination of these may contribute to a substantial increase in viscosity over weeks and months unless the coating is well formulated to prevent this increase in viscosity under such conditions. Through hundreds of tests, it has been determined that by reducing the molar ratio of water to trialkoxysilane to limit the extent of hydrolysis, the coating solution is much more stable. Coatings of the present invention with a water to trialkoxysilane molar ratio of 1.5:1 increased less than 5 cps in viscosity, typically 1 to 3 cps, after aging for several weeks at room temperature. Whereas a 1.5:1 molar ratio of water to trialkoxysilane will tend to be more stable than a similar coating having a 3:1 molar ration of water to trialkoxysilane, the latter will have better mar resistance than the former.

An oligomeric tintability enhancer is then added to improve the rate at which dye is absorbed by the coating. These are materials that have been found to improve dye absorption but not adversely affect stability, adhesion, and mar resistance, as do many of the other tint aids that have been reported by others. These oligomeric tintability enhancers include acrylated silicones (also referred to as "silicone acrylates" which include radiation-curable polymers and/or oligomers that are well known to the skilled worker. An overview of such coating compositions is given, for example, in P. K. T. Oldring (editor) Chemistry and Technology of UV and EB Formulations for Coatings and Paints, Vol. II, SITA Technology, London, 1991. The full content of said work insofar as it describes radiation-curable coating compositions is hereby incorporated by reference. In the silicone acrylate polymers or oligomers, the double bonds generally have a vinylidene structure ($CH_2$=CR structure where R=H or $CH_3$) which is derived from vinyl, allyl or methallyl esters, ethers or amines or from .alpha., .beta.-ethylenically unsaturated monocarboxylic acids such as acrylic acid, methacrylic acid or their amides. In the process of the invention, preference is given to polymers and/or oligomers whose double bonds are in the form of acrylate, methacrylate, acrylamide or methacrylamide groups. Examples thereof are polyether acrylates, polyester acrylates, unsaturated polyesters, epoxy acrylates, urethane acrylates, amino acrylates, melamine acrylates, silicone acrylates, and the corresponding methacrylates. Particularly preferred polymers and/or oligomers are selected from urethane (meth)acrylates, polyester (meth)acrylates, oligoether (meth)acrylates, and epoxy (meth)acrylates, particular preference being given, with regard to weathering stability of the coatings, to urethane (meth)acrylates and polyester (meth)acrylates, especially aliphatic urethane acrylates. The silicone (meth)acrylates are generally linear or cyclic polydimethylsiloxanes having acrylic and/or methacrylic groups, which are connected via an oxygen atom or via an alkylene group to the silicon atoms of the polydimethylsiloxane parent structure. Silicone acrylates are described, for example, in P. K. T. Oldring (see above), pp. 135 to 152. The disclosure made therein is hereby incorporated fully by reference. Urethane diacrylates such as urethane polyacrylates such as those disclosed in U.S. Pat. No. 7,034,063 and those having terminal and/or lateral double bonds as described in detail in patent applications and patents DE 196 45 761 A, WO 98/10028, EP 0 742 239 A1, EP 0 661 321 B1, EP 0 608 021 B1, EP 0 447 998 B1, and EP 0 462 287 B1 [This and some of the following are incomplete sentences]. Moreover, these constituents are commercially customary products and are sold, for example, under the brand name Rahn® 99-664 by the company Rahn. Acrylated polyesters such as Miramer® M4004 (Rahn), UCB 1360 (United Chemicals Belgium) and as disclosed in Radtech Conference Proceedings, April 1998, The Use of Acrylated Polyesters in the Formulation of Radiation Curable Adhesives, Tom Kauffman, Jim Chappell, Marga Acevedo; and U.S. Pat. No. 4,304,879, polyester polyols such as K-Flex™ 148 (King Industries) and K-Flex™ 188 (King Industries) and as disclosed in U.S. Pat. Nos. 6,927,252; 6,087,469; 5,977,256, alone or in combination, but typically no more than 20 percent by weight of the formulation.

A further advantage of the present invention is the improved clarity, greater transparency, increased light transmission and reduced haze or scattered light that results from the use of a reactive tintability enhancer that coreacts and polymerizes with the other monomers of the coating. Improvement in these properties is highly desirable for ophthalmic lenses.

The tintable coating solutions of prior art that use nonreactive tintability enhancers tend to look clear before they are cured because the tintability enhancer is dissolved in the coating solution. However, those tintability enhancers can or do become insoluble or at least less soluble in the coating. This can cause the enhancers to separate out from the bulk of the coating as the solvent evaporates and especially as the polymer of the coating is cured to the highly crosslinked state of a thermoset polymer that is needed for mar resistance to prevent scratches from occurring. The undissolved tintability enhancers can precipitate out or separate from the bulk into small domains (e.g., dispersed phases, dispersions or emulsions) that scatter light to create a haze and reduce transparency. These domains of very fine particles or regions of trapped liquid can be seen under a microscope. Due to enhanced contrast, the haze is even more noticeable or visually apparent after the lens has been tinted.

Coatings based on the present invention exhibit much greater clarity, greater transparency, greater light transmission, and lower haze values than coatings of prior art. This is because the tintability enhancers of the present invention can not separate out from the crosslinked polymer of the coating since they have reacted with and permanently become an integral part of the crosslinked polymer that comprises the coating itself.

The effects of light dispersion in coatings and layers may be readily measured with existing commercial equipment that compares the intensity and/or wavelength distribution of light that is reflected or transmitted through layers, one a standard or known value of transmission and/or reflectance and the other being the layer or coating to be measured for light dispersing effect. Emulsions or dispersions or suspensions of material having different indices of refraction (which dispersed, suspended or emulsified enhancers would be likely to have) alter the transmission and/or reflectance of light and change its intensity and/or wavelength composition and organization by absorbance, refraction, or light dispersing effects, such as edge defects.

A system or method for measuring such differences in reflected or transmitted radiation (e.g., IR, UV or visible radiations) might be constructed and perform as a set of light detectors that may be any light detection system that can quantify the amount of incident radiation received by the detector. It is possible to use semiconductor, piezoelectric, electro-optic, wide area detectors, fiber optic or other detection systems at the choice of the designer. A preferred system would use a Model 371 Optical Power Meter (available from United Detector Technology, Baltimore, Md.). The laser light used was a LaserMax, Inc., Model LAS 200-650-5 (available from LaserMax, Inc. Rochester, N.Y.). One example is a single chip channel GaAs electro-optic waveguide device. The device comprises an input waveguide, into which the beam is input, and a 1 to 16 way multimode interference splitter for splitting the input beam into n different outputs. For example, this may be a multimode interference splitter as described in U.S. Pat. No. 5,410,625. The device also comprises 16 electro-optic waveguides for optical phase control, each electro-optic waveguide may have an electrode for applying an electric field across each waveguide. The system my be self-contained, with transparencies inserted into an apparatus, the apparatus closed against incident radiation and light, measurements taken and recorded and evaluated, and the system opened for removal of that system. Blockage of ambient light is desirable or essential for precise measurements. The ratios of $(\lambda_T)/\lambda_S)$ (that is where $(\lambda_S)$ is the amount of light incident on the transmitting or reflecting surface and $(\lambda_T)$ is the amount of light reflected or transmitted) or $(\lambda_S)/(\lambda_T)$ are highly meaningful and represent clear indicators of the suitability of transparencies, even before they are projected onto a screen. In different uses, different ratios may be acceptable, but the user can determine what values are acceptable or not, or a program associated with a processor receiving the data can evaluate the suitability of the ratio for any use or specific uses. For example, where a small decrease in light transmission is tolerable, a low $(\lambda_S)/\lambda_T)$ ratio (e.g., 1.0-1.2; or 1.0-1.1) may be acceptable. On the other hand, where there is a very large tolerance for decrease in transmission or eflectance, a higher $(\lambda_S)/\lambda_T)$ ratio (e.g., 1.15-2.0 or greater) may be acceptable. It is preferred that $(\lambda_S)/(\lambda_T)$ have a value between 1.0 and 1.15 or between 1.0 and 1.10 or between 1.0 and 1.05. These values may also be referred to as percentage decreases in transmission of light (or reflectance of light) by comparing the $(\lambda_S)$ to the $/\lambda_T)$ as $(\lambda_T/\lambda_S))/(\lambda_S)$ being between 95-100%, between 97-100%, between 98-100%, or between 99-100% relative transmission, this ratio at a wavelength of maximum absorption of the coating (e.g., with any photochromic dye at approximately full optical density or with the photochromic dye at near minimum optical density) being herein defined as relative transmission.

Optionally, various acrylates may be added, which may be a combination of di-, tri-, tetra-, penta- or hexa-acrylates, as determined by the desired properties, including viscosity, tintability, mar resistance, and adhesion. Variations in the ratio of trialkoxysilane to acrylated monomers can be made to develop coatings that meet the specific requirements of customers, such as better adhesion, increased mar resistance, or faster tint absorption.

Optionally, one or more organic solvents may be added to improve stability, reduce viscosity, improve cosmetics, enhance adhesion, and lower costs. Suitable solvents include, but are not limited to, methanol, ethanol, 1-propanol, 2-propanol, 1-butanol, 2-butanol, 2-propanone, 2-butanone, 3-pentanone, 1-methoxy-2-propanol, tetrahydrofuran and 2-butoxyethanol.

Optionally, additives such as surfactants and flow modifiers may be added as needed to enhance wetting for good adhesion, and to improve flow and leveling for good cosmetics. These may be used either alone or in combination and include FC-4430 (3M), FC-4432 (3M), BYK 371 (BYK Chemie), Fluor N 561 (Cytonix), Fluor N 562 (Cytonix), and Fluor N 2900 (Cytonix), and Fluor N 489 (Cytonix). Fluorochemical surfactants and organosilicon surfactants are preferred, but any functional surfactant may be used in this non-limiting aspect of the invention.

Lastly, one or more photoinitiators are to be added. These are independently selected from the free radical or cationic type based upon the energy source that is to be used to effect cure. The specific energy source for cure will of course largely determine which photoinitiator is used for a specific application. In the event that the energy source for effecting cure is electron beam and the coating contains no oxirane functional monomers, no photoinitiator will be required. Some examples of potentially suitable photoinitiators include Irgacure® 184, Irgacure® 1700, Irgacure® 651, Irgacure® 500, Darocur® 1173, and combinations thereof. The free-radical photoinitiators and some cationic initiators may be generally selected as free radical photoinitiators such as the quinones, benzophenones, benzoin ethers, aryl ketones, peroxides, biimidazoles, diaryliodoniums, triarylsulfoniums (and phosphoniums), diazoniums (especially the aromatic diazoniums), etc. may be used in the compositions of the present invention, generally in amounts of from 0.1 to 15% by weight, preferably from 0.3 to 10% by weight, more preferably from 0.5 to 8% by weight of the curable compositions.

As noted above, both U.S. Pat. No. 6,780,232 (Treadway) and U.S. Pat. No. 7,037,585 (Treadway) teach the use of an unhydrolyzed oxirane functional siloxane that is added to reduce the viscosity of the coating solution and effectively reduce the extent of hydrolysis, as without this measure these coatings tend to have poor stability with respect to viscosity. The use of additional unhydrolyzed siloxane monomer is not needed in the coatings of the present invention, which are surprisingly more stable with respect to viscosity on aging. In an effort to simplify the preparation process, improve mar resistance, and enhance receptivity towards antireflective coatings, the present invention purposely avoids this approach taken by Treadway. Relative to other tintable radiation cured coatings, the coatings of the present invention have been shown to have excellent stability, while maintaining rapid dye absorption, and have considerably better mar resistance in the Bayer test, a standard test that is widely used and accepted in the ophthalmic lens industry. The polymeric substrate to be coated is first cleaned using means that are commonly employed in the relevant industry and suitable for the substrate that is to be coated. For example, in the ophthalmic lens industry, lenses may be cleaned by washing with high pressure water optionally containing anionic, nonionic, or cationic detergents or alcohols or any combination of these. The substrate or articles to be coated may also be cleaned using a vapor degreaser. Alternatively or in conjunction with a washing step, the substrate may be pretreated with a combination caustic cleaning solutions, corona discharge, or some type of plasma.

The prepared coating is can be applied by spinning or dipping. The temperature of the coating may be at room temperature or even slightly above or below room temperature at the time that the coating is applied.

In addition to electron beam, suitable radiation for curing the coatings of the present invention includes wavelengths of the ultraviolet, visible, and infrared regions of the electromagnetic spectrum. In the case of ophthalmic lenses, a spin coater such as an ASC-500 (Calmation) having an ultraviolet lamp with a smooth elliptical reflector (Fusion Systems) provides excellent results with high throughput at exceptional yield. Typical cured film properties are as follows Dry Film Thickness: 4.0 microns Refractive Index: 1.5 585 nanometers Percent Haze: 0.3

Yellowness Index: 0.8

Steel Wool Rating: 4

Bayer Ratio: 2.0

Cyclic Humidity Test: pass with no visible defects

Boiling Deionized Water: pass with no visible defects after immersing for 60 minutes Percent Total Light Transmission: 18 after tinting for thirty minutes at 205 F Buffered Boiling Saltwater Test: pass with no defects or loss of adhesion after six cycles Resultant products with the coatings of the present invention can have a Bayer ratio of greater than 1.0, preferably greater than 1.5, more preferably greater than 2.0, and most preferably greater than 3.0.

A general range of the compositions useful in the practice of the technology described herein may be generally considered as comprising the following, with percentages given on a weight basis:
20-80% trialkoxysilane,
5-20% water,
1-25% dye absorbing oligomer;
0% or 1-40% diacrylate;
0% or 1-20% polyacryloyl monomer having at least 3 acrylyoyl groups;
0.1-10% photoinitiator (free-radical);
solvent to 100%.

The technology described herein comprises all of composition technology, coating technology, coating process technology and coated articles. This technology may include at least A coating composition comprising:

a) at least one organofunctional trialkoxysilane monomer in the amount of from 20 to 80 percent by weight, said trialkylsiloxane monomer having the formula;

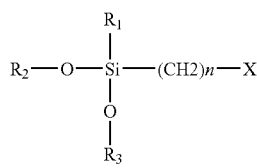

where $R_1$, $R_2$, and $R_3$ are independently selected from alkyl groups of 1 to 8 carbon atoms;
n is an integer 1 through 6, inclusive,
and X is selected from the group consisting of glycidyl, acrylate, methacrylate, acrylamide, methacrylamide, N-methylacrylamide, N-methylmethacrylamide, vinyl, and allyl;

b) water to hydrolyze at least one third of alkoxy groups of the trialkoxysilane monomer; and c) from 1.0 to 25.0 percent by weight at least one oligomeric tintability enhancer. The organofunctional group should itself be polymerizable in a process with or distinct from the polymerization of the silane functionality. The oligomeric tintability enhancer should have a solubility (in its oligomerized form) for at least one disperse dye so that the disperse dye is at least 5× more by weight absorbed into the dye-absorbing oligomeric tintability enhancer than the same disperse dye is absorbed by a polymer consisting of units derived from the organofunctional trialkoxysilane under dye-tinting absorption conditions of immersion in a hot (95° C.) aqueous solution with at least 0.2% by weight dye/water.

The coating composition may have the oligomeric tintability enhancer selected from the group consisting of polyester polyol, urethane polyol, acrylic polyol, and acrylated polyurethane. The composition may further comprise from 1.0 to 10.0 percent by weight one or more photoinitiators independently selected from the free radical and cationic photoinitiators. The photoinitiators may be active for the organofunctional group (e.g., epoxy, ethylenically unsaturated groups etc.) and/or the silane. The composition may also further comprise an organic solvent and/or one or more surfactants or wetting agents are present ion an amount between 0.1 and 15% by weight of the total composition. The composition preferably has the trialkoxysilane comprise an epoxy-trialkoxysilane. The composition may also further comprise at least 1% by weight of a diacrylate monomer in the composition.

Also described herein is a method of providing a coated mar resistant layer on a polymeric article having at least one exposed surface comprising coating the composition described herein onto the exposed surface of the polymeric surface, polymerizing at least the trialkoxysilane component of the composition, to form a polymerized coating immersing the polymeric article in an aqueous solution of disperse dye, and absorbing sufficient dye into the polymerized coating to absorb at least 70%, 75%, 80%, 85%, 90% and more of incident visible radiation at a maximum wavelength of absorption of the disperse dye. The method may have the aqueous solution at a preferred temperature of between 85 and 99° C. The method is preferably continued until sufficient disperse dye is absorbed to absorb at least 80% of incident visible radiation at a maximum wavelength of absorption of the disperse dye. The polymerizing preferably causes the trialkoxysilane to react with the oligomeric tintability enhancer, binding it into the polymerized coating. Measuring of dye tintability strength between compositions may also be measured between the composition containing only trialkoxysilane monomer and a composition containing only the trialkoxysilane monomer and tintability enhancer to measure the absorbance capability with the at least 5× improvement in dye absorbance for 1 hour at 195 C and 1% dye concentration. The technology described herein also preferably comprises an ophthalmic lens having a polymerized coating on at least one surface of the lens formed from the coating composition described herein by the method described herein 1, the polymerized coating having sufficient disperse dye dissolved therein to absorb at least 70% of transmitted light of a wavelength at which the disperse dye has its maximum absorption.

EXAMPLES

Example 1

Tintable, Highly Mar Resistant Coating of the Present Invention

The following example of the present invention is for illustrative purposes only and is not intended to limit the scope of the invention.

Formula:

| | Material | Parts by Weight |
|---|---|---|
| (1) | 3-glycidoxypropyltrimethoxysilane (Degussa) | 55.19 |
| (2) | deionized water | 6.31 |
| (3) | Miramer ® M4004 acrylated polyester oligomer (Rahn) | 10.00 |
| (4) | 1,4-butanediol diacrylate (Sartomer) | 20.00 |
| (5) | dipentaerythritol hexaacrylate (Rahn) | 10.00 |
| (6) | BYK 333 disperse dye (BYK Chemie) | 0.50 |
| (7) | Darocur ® 1173 (Ciba Specialty Chemicals) | 4.00 |
| (8) | Cyracure ® 6976 (Dow Chemical) | 4.00 |
| | Subtotal | 110.00 |
| | methanol lost via evaporation | −10.00 |
| | Total | 100.00 |

Preparation Procedure:

The above materials at room temperature were combined in the listed order in a clean, dry, open mixing vessel equipped with a means of agitation. After adding the deionized water, the mixture was allowed to stir in the open vessel for 24 hours to effect hydrolysis and allowed to come to equilibrium before adding the remaining materials in rapid succession.

Following the addition of the last material, the mixture was stirred for fifteen minutes before being placed in one or more sealed containers and stored at room temperature for later use.

Application Procedure:

The coating solution prepared above was allowed to come to room temperature and was applied to a polycarbonate finished single vision lens with a 6 diopter base curve using an ASC-500 (Calmation) automated spin coater that has been fitted with an ultraviolet light source having a smooth elliptical reflector as a curing unit (Fusion Systems).

Performance Properties:
Dry Film Thickness: 4.0 microns
Percent Haze: 0.3
Yellowness Index: 0.8
Refractive Index: 1.5 at 585 nanometers
Steel Wool Rating: 4
Bayer Ratio: 2.5
Cyclic Humidity Test: pass with no visible defects
Boiling Deionized Water: pass with no visible defects after immersing for 60 minutes
Percent Total Light Transmission: 18 after tinting for thirty minutes at 205 F
Buffered Boiling Saltwater Test: pass six cycles with no defects or loss of adhesion Comparative Example Tests performed on UVHC 8558 abrasion resistant coating (General Electric) and UV-NV abrasion resistant coating (Ultra Optics) typically gave Bayer ratios less than 1.5 and steel wool ratings of 2 to 3. Furthermore, both of these coatings showed some delamination or loss of adhesion when the crosshatch tape adhesion test (ASTM D 3359-02) was employed in conjunction with the cyclic humidity test (ASTM D 2247), as is commonly done in the ophthalmic lens industry.

The invention claimed is:

1. A method of providing a coated mar resistant layer on a polymeric article having at least one exposed surface comprising coating a composition onto the exposed surface of the polymeric surface, the composition comprising:
   a) at least one organofunctional trialkoxysilane monomer in the amount of from 20 to 80 percent by weight of the composition, said trialkoxysilane monomer having the formula

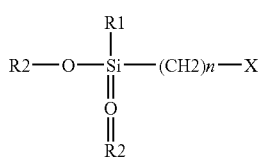

where $R_1$, $R_2$, and $R_3$ are independently selected from alkyl groups of 1 to 8 carbon atoms;
   n is an integer 1 through 6, inclusive,
   and X is selected from the group consisting of glycidyl, acrylate, methacrylate, acrylantide, methacrylamide, N-methylacrylaniide, N-methylmethacrylamide, vinyl, and allyl;
   b) water to hydrolyze at least one third of alkoxy groups of the trialkoxysilane monomer; and
   c) from 1.0 to 25.0 percent by weight at least one oligomeric tintability enhancer polymerizing at least the trialkoxysilane component of the composition to form a polymerized coating, immersing the polymeric article in an aqueous solution of disperse dye so that the mar resistant layer is directly exposed to the aqueous solution, and absorbing sufficient dye into the polymerized coating to absorb at least 70% of incident visible radiation at a maximum wavelength of absorption of the disperse dye.

2. A method according to claim 1 wherein the oligomeric tintability enhancer has a solubiloity for at least one disperse dye so that the disperse dye is at least 5× more by weight absorbed into the dye-absorbing enhancer than the same disperse dye is absorbed by a polymer consisting of units derived from the organofunctional trialkoxysilane under dye-tinting conditions of immersion in a hot aqueous solution of 95° C. with 0.2% by weight dye/water.

3. A method according to claim 1 wherein the oligomeric tintabiity enhancer is selected from the group consisting of polyester polyol, urethane polyol, acrylic polyol, and acrylated polyurethane.

4. A method according to claim 2 further comprising from 1.0 to 10.0 percent by weight of one or more photoinitiators independently selected from free radical and cationic photoinitiators.

5. A method according to claim 2 further with the coating composition further comprising and organic solvent.

6. The method of claim 1 wherein the aqueous solution is at a temperature of between 85 and 99° C.

7. The method of claim 6 wherein sufficient disperse dye is absorbed to absorb at least 80% of incident visible radiation at a maximum wavelength of absorption of the disperse dye.

8. The method of claim 6 wherein polymerizing causes the alkoxysilane to react with the oligomeric tintability enhancer.

9. The method of claim 1 wherein X comprises glycidyl.

10. A method of providing a coated mar resistant layer on an article consisting of polymeric ophthalmic lens having at least one exposed surface, the exposed surface having a single coating layer thereon comprising coating a composition comprising:

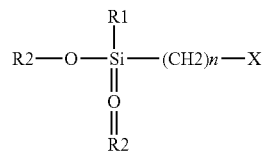

where $R_1$, $R_2$, and $R_3$ are independently selected from alkyl groups of 1 to 8 carbon atoms;
   n is an integer 1 through 6, inclusive,
   and X is selected from the group consisting of glycidyl, acrylate, methacrylate, acrylamide, metbacrylaniide, N-methylacrylamide, N-methylmethacrylamide, vinyl, and allyl;
   b) water to hydrolyze at least one third of alkoxy groups of the trialkoxysilane monomer; and
   c) from 1.0 to 25.0 percent by weight at least one oligomeric tintability enhancer onto the exposed surface of the polymeric surface, polymerizing at least the trialkoxysilane component of the composition, to form a polymerized coating immersing the polymeric article in an aqueous solution of disperse dye so that the mar resistant layer is directly exposed to the aqueous solution, and absorbing sufficient dye into the polymerized coating to absorb at least 70% of incident visible radiation at a maximum wavelength of absorption of the disperse dye.

11. The method of claim 10 wherein X comprises glycidyl.

12. A method according to claim 9 wherein the oligomeric tintability enhancer is selected from the group consisting of polyester polyol, urethane polyol, acrylic polyol, and acrylated polyurethane.

13. A method according to claim 10 wherein the oligomeric tintability enhancer is selected from the group consisting of polyester polyol, urethane polyol, acrylic polyol, and acrylated polyurethane.

14. A method according to claim 9 wherein the oligomeric tintabiity enhancer comprises a polyester polyol.

15. A method according to claim 10 wherein the oligomeric tintability enhancer comprises a polyester polyol.

16. A method according to claim 11 wherein the oligomeric tintability enhancer comprises a polyester polyol.

17. A method according to claim 12 wherein the oligomeric tintability enhancer comprises a polyester polyol.

18. The method of 17 wherein the aqueous solution is at a temperature of between 85 and 99° C.

* * * * *